(12) United States Patent  
Magari

(10) Patent No.: US 6,347,698 B1
(45) Date of Patent: Feb. 19, 2002

(54) MODULAR CONVEYOR APPARATUS

(75) Inventor: Sean A. Magari, Baldwinsville, NY (US)

(73) Assignee: Lipe Automation Corp., Liverpool, NY (US)

( * ) Notice: Subject to any disclaimer, the term of this patent is extended or adjusted under 35 U.S.C. 154(b) by 0 days.

(21) Appl. No.: 09/609,979

(22) Filed: Jul. 5, 2000

(51) Int. Cl.[7] ............................................... B65G 27/00
(52) U.S. Cl. ........................ 198/771; 198/389; 198/391
(58) Field of Search ................................ 198/771, 389, 198/391

(56) References Cited

U.S. PATENT DOCUMENTS

| | | | |
|---|---|---|---|
| 3,015,308 A | * | 1/1962 | Beresford |
| 3,841,471 A | | 10/1974 | Mead |
| 3,995,733 A | | 12/1976 | Mead |
| 4,037,710 A | | 7/1977 | Brutcher |
| 5,184,716 A | * | 2/1993 | Gaines |
| 5,277,300 A | * | 1/1994 | Maggioni |
| 5,301,791 A | | 4/1994 | Shampine |

* cited by examiner

Primary Examiner—Stephen T. Gordon
Assistant Examiner—Scott Carpenter
(74) Attorney, Agent, or Firm—Neal L. Slifkin; Harris Beach LLP

(57) ABSTRACT

An extruded brush plate for a conveyor is provided with slots preformed in the brush plate for attachment of supports, vibrators and peripheral walls. The brush plates are then cut to the desired length, by making only a single cut across the width of the brush plates. T-slots for attaching the vibrators and the bolt slots for attaching the peripheral walls are provided along the entire length of the brush plate such that when the brush plate is cut to any length, the vibrators may be attached where desired. Also the bolt slots will be accessible from the end of the brush plate, so that the peripheral walls may be attached. The T-slots are designed to accept T-nuts. The vibrator is attached to an interface plate. The interface plate includes threaded holes to accept a bolt. The T-nut is threaded onto the bolt and the T-nut is slipped into the T-slot so that the vibrator is attached to the brush plate. The bolt slots may be tapped such that bolts may be threaded into the bolt slots to attach the peripheral walls.

7 Claims, 7 Drawing Sheets

MODULAR CONVEYOR APPARATUS

FIELD OF THE INVENTION

The present invention relates to vibratory pile conveyor systems and, more particularly, to an improved modular conveyor system for delivering articles in a desired uniform orientation to a work station area.

DISCUSSION OF THE RELATED ART

The assignee of the present application is also the assignee of U.S. Pat. Nos. 3,995,733, 3,841,471, 4,037,710 and 5,301,791. The disclosures of which are incorporated herein by reference.

The prior art systems disclosed in these patents include the typical vibratory pile conveyor element which includes a feeder surface or trough having a pile material on its surface. The material includes resilient fibers inclined by about 5 to 25 degrees in the direction of motion of objects or articles to be moved along the feeder surface. Movement of the articles or objects is accomplished by vibrators connected to the feeder surfaces by flexible arms.

These systems have been used in various industries for moving any variety of manufactured articles through a production or process system. The system disclosed in U.S. Pat. No. 3,995,733 is directed to a trough-shaped element lined with pile material.

The feeder and orienter disclosed in U.S. Pat. No. 3,841,471 provides larger feeder surface areas for accommodating bulk quantities of articles dropped from a supply bin. This system provides for the recycling of objects not properly aligned upon discharge.

U.S. Pat. No. 4,037,710 discloses an accumulator for an object feeder of the vibratory type covered with pile material. The preferred embodiment disclosed therein includes an accumulator composed of a vibratory pile conveyor element positioned along one side of the main feed portion of an object feeder surface. The accumulator recycles articles or objects that were crowded out of the main feed portion for later transfer back onto the object feeder.

U.S. Pat. No. 5,301,791 discloses a vibratory pile conveyor system for delivering elongated articles in a desired uniform orientation to a work station area. The system provides for rapid processing of a continuous flow of unordered and disorganized articles so that the articles enter a work station area with a desired uniform orientation.

The present invention is designed to be used in a conveyor system having an input chute with parallel feeder surfaces. The input chute is provided to direct articles into an accumulator also having independent feeder surfaces. A quantity of articles cycle through the accumulator and are eventually transferred to a delivery feeder surface which in turn directs the flow of articles onto a high-speed endless belt conveyor. The feeder surface rests on a brush plate which is suspended over a vibration table. All of the feeder surfaces are covered with pile material having resilient filaments inclined in the direction of movement of the articles, and are independently vibrated by the method of prior art vibrators. As the articles enter the loading station end of the belt conveyor they are automatically oriented with their longitudinal axes parallel to the direction of travel of the endless belt conveyor. A safety bar is provided at the other end of the belt conveyor to ensure proper alignment of the articles or to return unaligned articles to the accumulator for recycling. The high-speed belt conveyor terminates with a discharge station section adjacent to a work station area. At this work station area, any number of a variety of operations may be conveniently performed on the uniformly oriented and aligned elongated articles. Such operations might include the encoding or reading of information, labeling, inspecting, testing, and stamping or spraying.

After undergoing the operations performed at the work station area, the articles are then transferred to other areas for further processing or handling. As an illustrative elongated article, the accompanying figures show a bulb having an enlarged head. The present invention is not limited to processing bulbs, however, and is easily adapted to accommodate any variety of elongated articles such as bottles and cans.

SUMMARY OF THE INVENTION

In the past, the brush plate supporting the pile material was formed through a series of operations including shearing, punching, bending and welding the brush plate and accompanying support structure into the desired configuration. This process was time consuming and the brush plate was expensive to manufacture. The present invention minimizes the manufacturing time and effort by providing an extruded brush plate with slots pre-formed in the brush plate for attachment of supports, vibrators and peripheral walls. The brush plates may be extruded in a variety of desirable widths and to a standard length. We have found that twenty-four feet lengths standard lengths are convenient, but any suitable length may be extruded. The brush plates are then cut to the desired length, by making only a single cut across the width of the brush plates. The need for only this single operation greatly reduces the manufacturing cost for the brush plates. The T-slots for attaching the vibrators and the bolt slots for attaching the peripheral walls are provided along the entire length of the brush plate such that when the brush plate is cut to any length, the vibrators may be attached where desired. Also the bolt slots will be accessible from the end of the brush plate, so that the peripheral walls may be attached. Preferably, the brush plates are manufactured in a variety of widths.

The T-slots are designed to accept T-nuts. The vibrator is attached to an interface plate. The interface plate includes threaded holes to accept bolts. The T-nut is threaded onto the bolt and the T-nut is slipped into the T-slot so that the vibrator is attached to the brush plate.

The bolt slots may be tapped such that bolts may be threaded into the bolt slots to attach the peripheral walls.

BRIEF DESCRIPTION OF THE DRAWINGS

Additional features will be apparent from the following description of the preferred embodiment shown in the drawings wherein.

DETAILED DESCRIPTION

Figure 1:
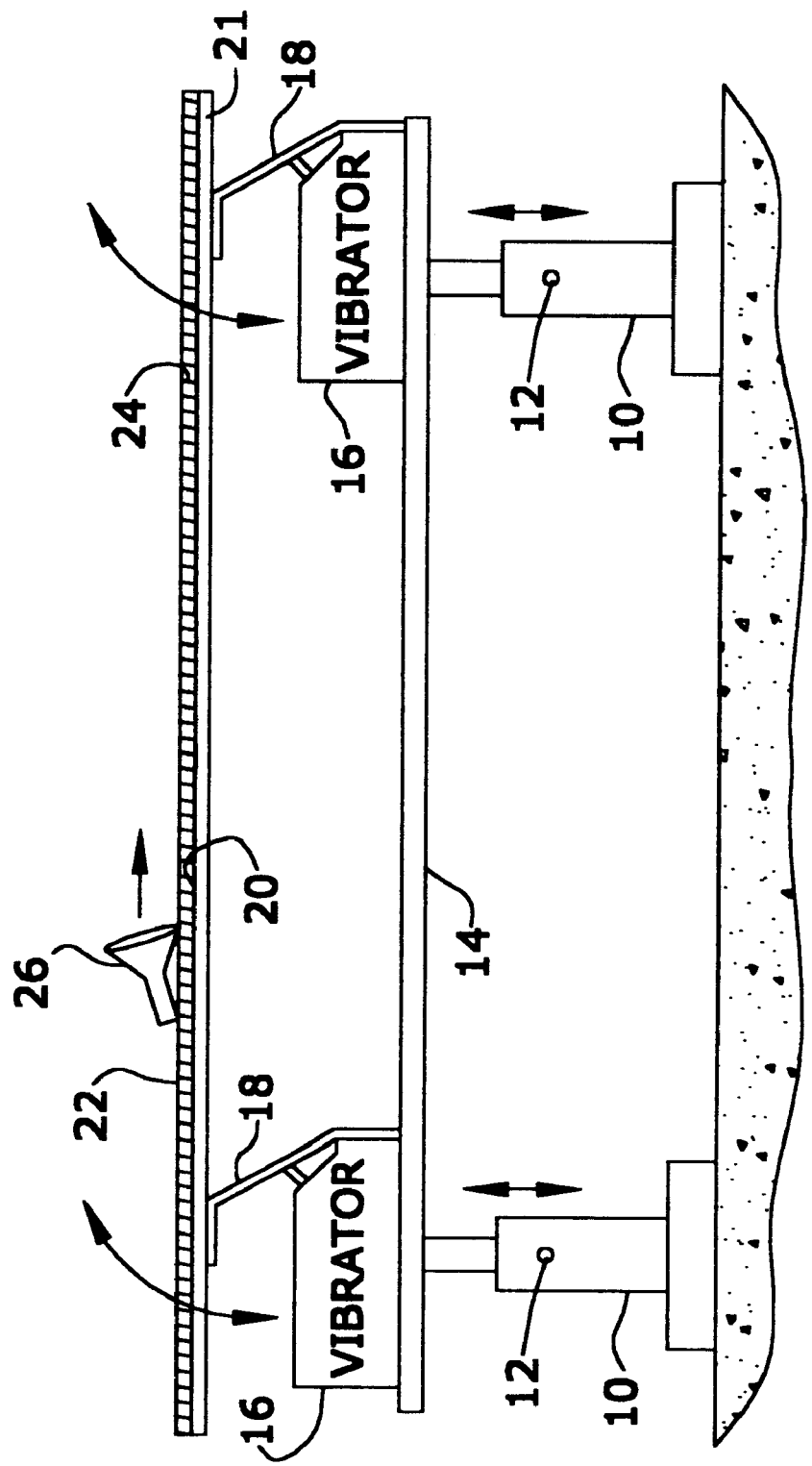
FIG. 1 is a side elevation section view showing a prior art vibratory pile conveyor element.

Referring first to FIG. 1 which shows a prior art vibratory conveyor element. The typical vibratory conveyor element includes telescopically adjustable legs 10 adjusted by set screws 12. A base 14 is mounted on adjustable legs 10 and has positioned thereon vibrators 16, each vibrator 16 having a flexible vibrator arm 18.

A feeder surface 20 is mounted on a brush plate 21 connected to flexible vibrator arms 18. Feeder surface 20 is covered with pile material 22 which includes resilient filaments 24. The resilient filaments 24 are inclined by about 5 to 25 degrees in the direction of travel of articles 26.

When the vibrators are actuated in the prior art vibratory conveyor, spring arms 18 move the feeder surface 20 in a generally linear motion in the direction of inclination of resilient filaments 24. Articles 26 are thereby moved in the direction of inclination of resilient filaments 24 as indicated by the arrows in FIG. 1.

The vibratory motion of feeder surface 20 will move articles along the surface even if the surface is not covered by pile material 22, or if covered with a solid material other than pile material 22. Covering feeder surface 20 with pile material 22, however, greatly increases the speed and feeding force of articles 26 along feeder surface 20, and also allows feeder surface 20 to have a much greater length for a given amount of vibrational energy consumed. The vibration amplitude and frequency of vibrators 16 is adjustable and is selected as a function of the mass and shape of articles 26 and the characteristics of pile material 22.

Figure 2:
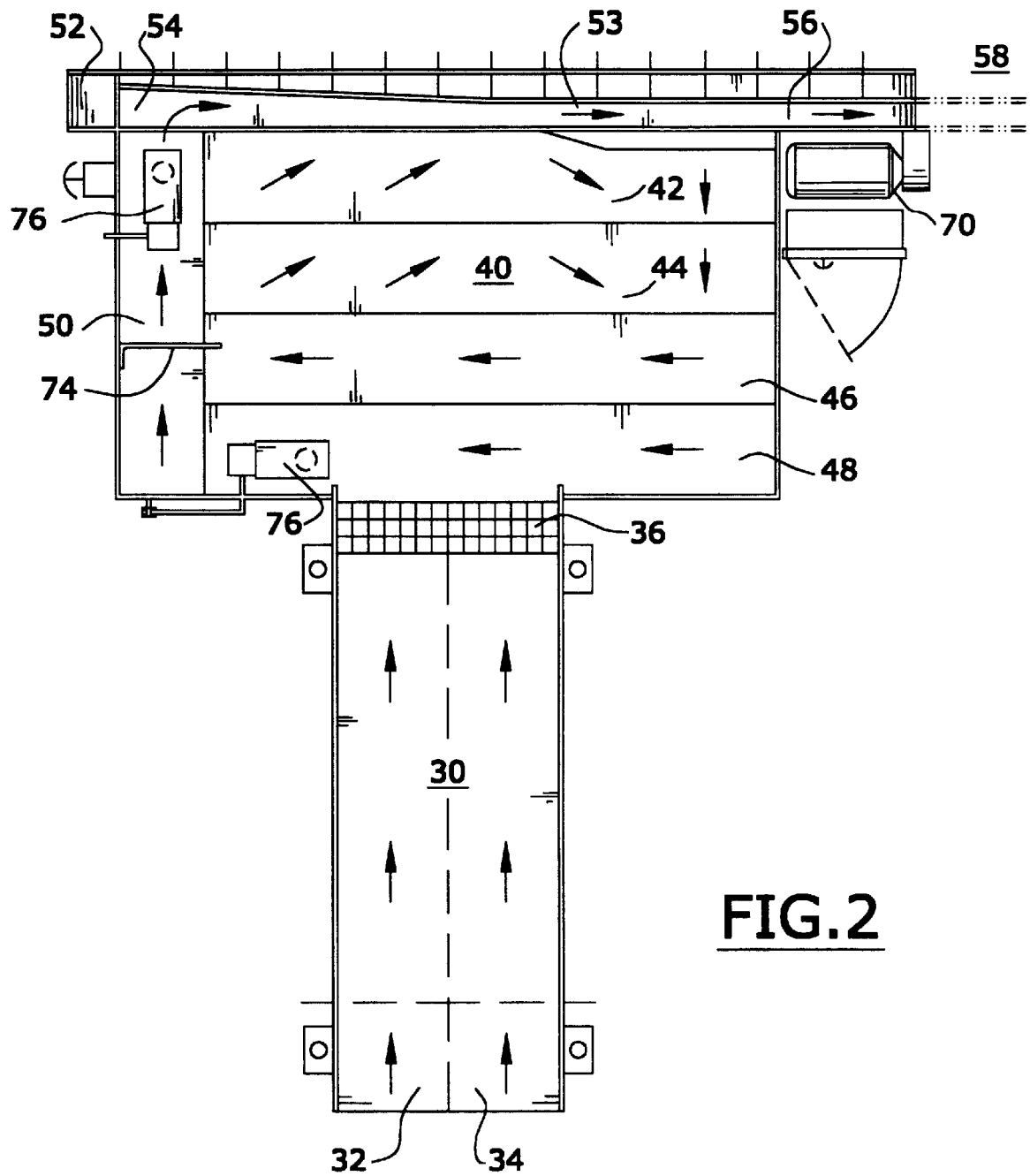
FIG. 2 is a top plan view of the conveyor system according to the present invention.

Referring now to FIG. 2 wherein there is shown an accumulator 40 including four parallel feeder surfaces 42, 44, 46 and 48. Positioned perpendicular to feeder surface 48 of accumulator 40 is an input chute 30. The input chute 30 has two parallel feeder surfaces 32 and 34. Positioned adjacent to one side of the accumulator 40 is a delivery feeder surface 50. Delivery feeder surface 50 feeds articles 26 onto an endless belt conveyor 52 having an upper run 53 which travels over a linear path of travel from a loading station 54 to a discharge station 56.

The feeder surfaces 32, 34, 42, 44, 46, 48 and 50 are each covered with pile material 22. In this preferred embodiment, each of the feeder surfaces also has positioned thereunder vibrators 16 connected to the brush plate in the manner described below and may be controlled independently of each other, with respect to vibration amplitude and frequency, by electronic means well known in the art.

Figure 3:
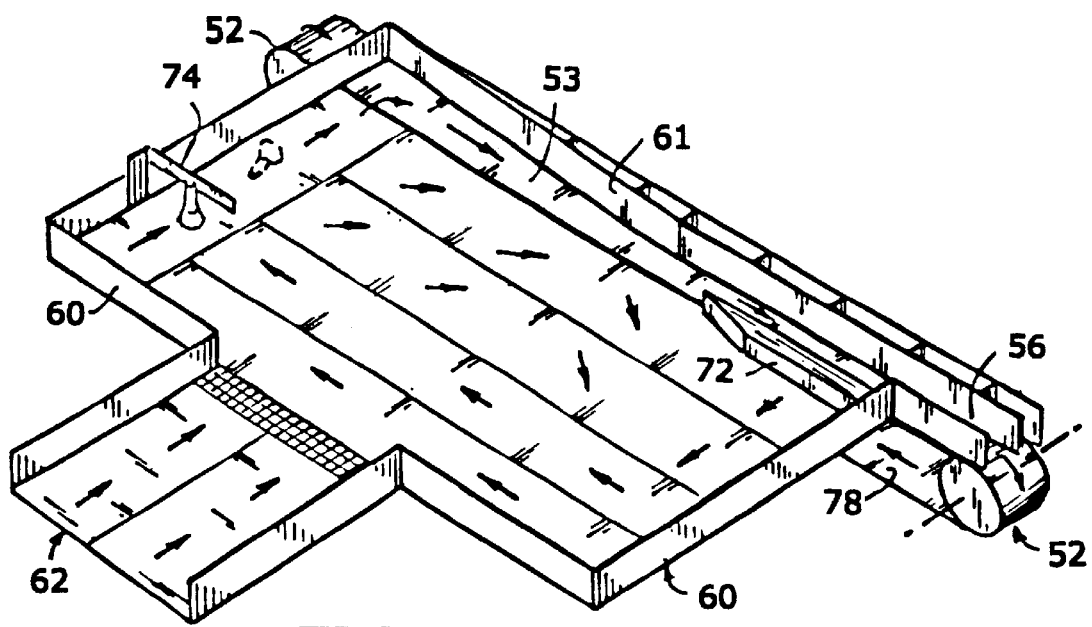
FIG. 3 is a perspective view of the conveyor system according to the present invention.

A variable speed drive motor 70 is provided to drive the endless belt conveyor 52 along its path of travel from loading station 54 to discharge station 56 at a desired speed. Shown in FIGS. 2 and 3 is a knock-down arm 74 positioned above delivery feeder surface 50. Arm 74 is utilized in this embodiment to place articles 26 into a position such that they lie flat on the feeder surface rather than standing on end before entering loading station 54.

Figure 4:
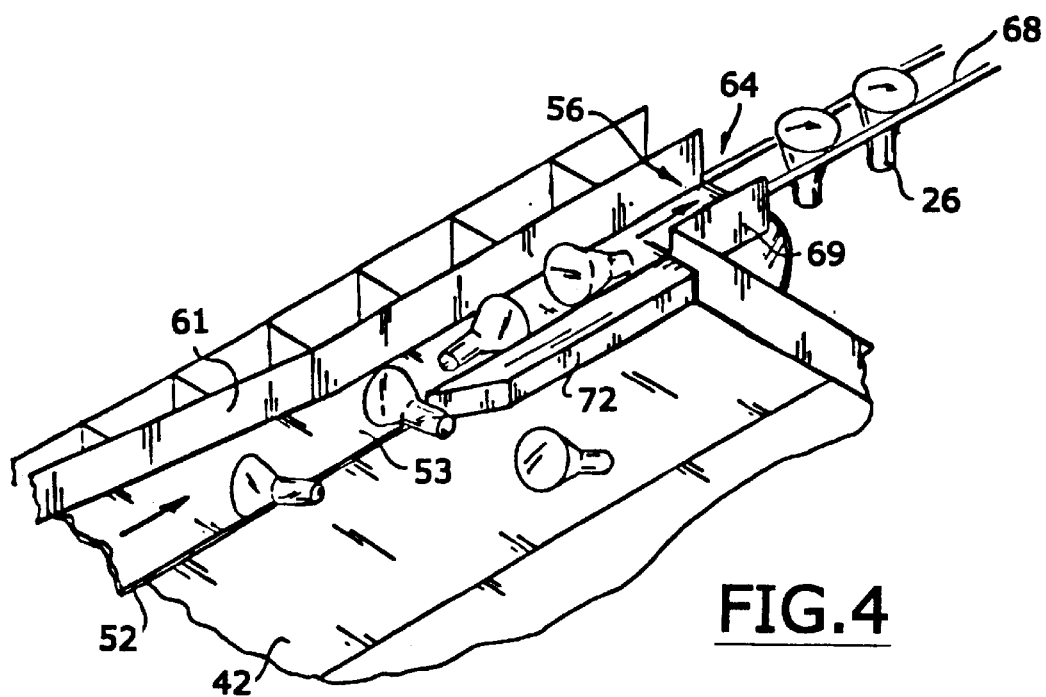
FIG. 4 is an enlarged perspective view of the discharge station portion of the conveyor system according to the present invention.
Figure 5:
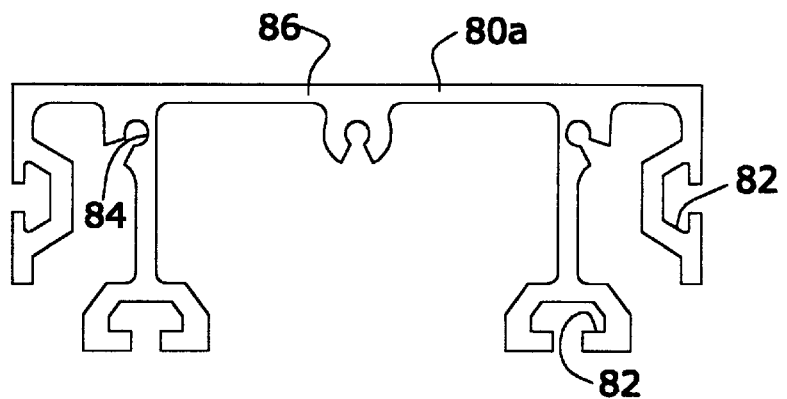
FIG. 5 is an end view of a brush plate according to the present invention.
Figure 6:
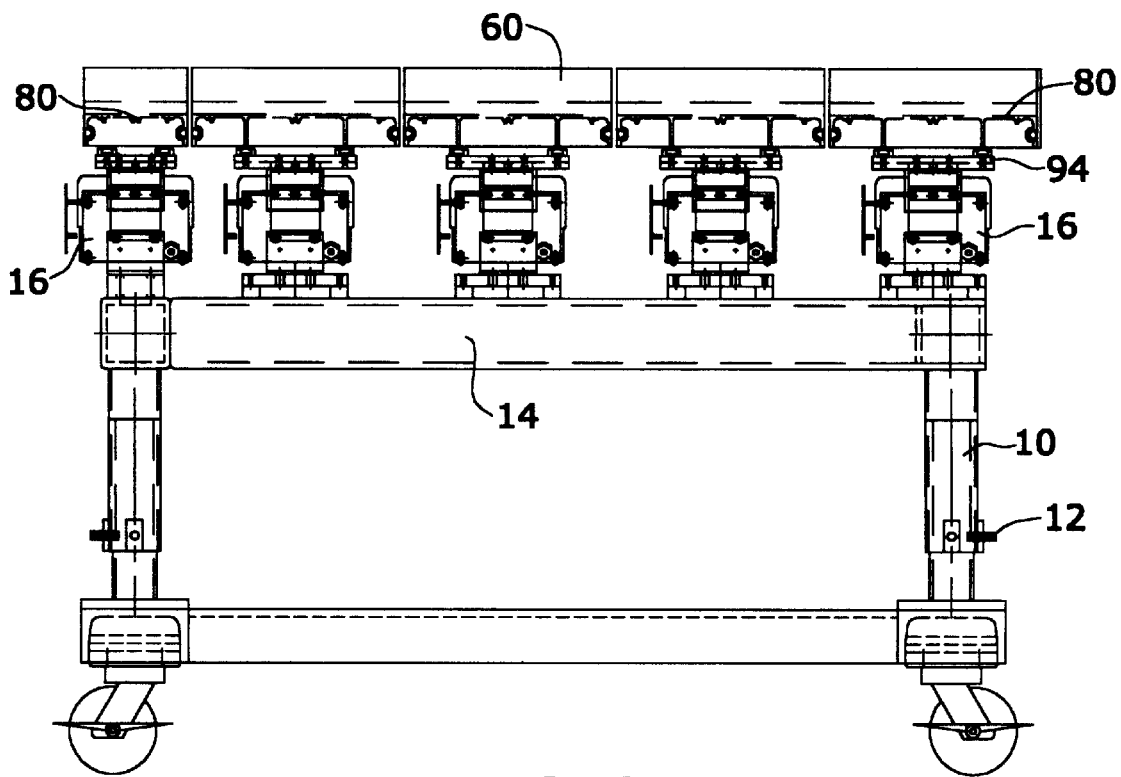
FIG. 6 is an end view of the conveyor system according to the present invention.
Figure 7:
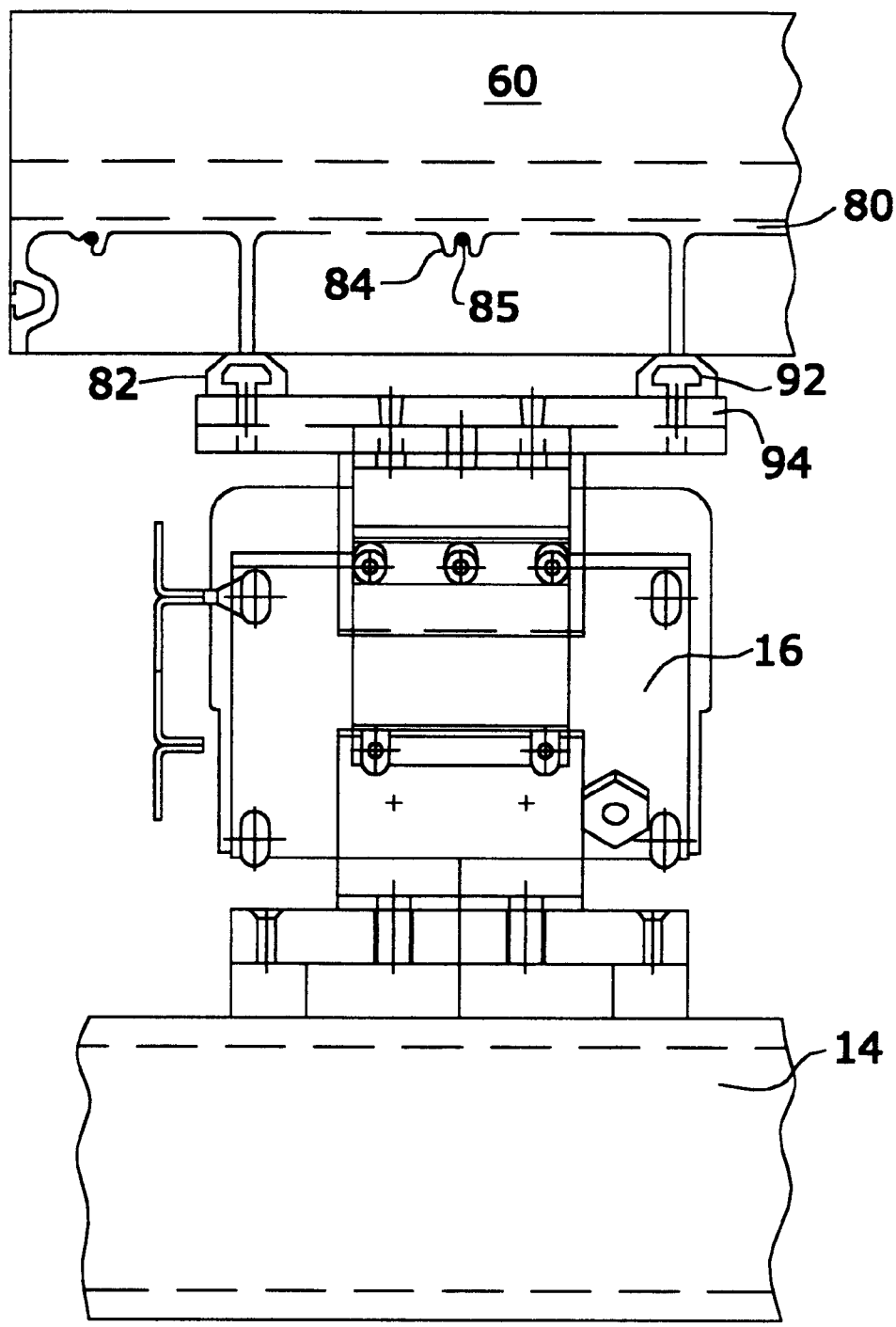
FIG. 7 is an enlarged end view of a portion of the conveyor system of FIG. 6.
Figure 8:
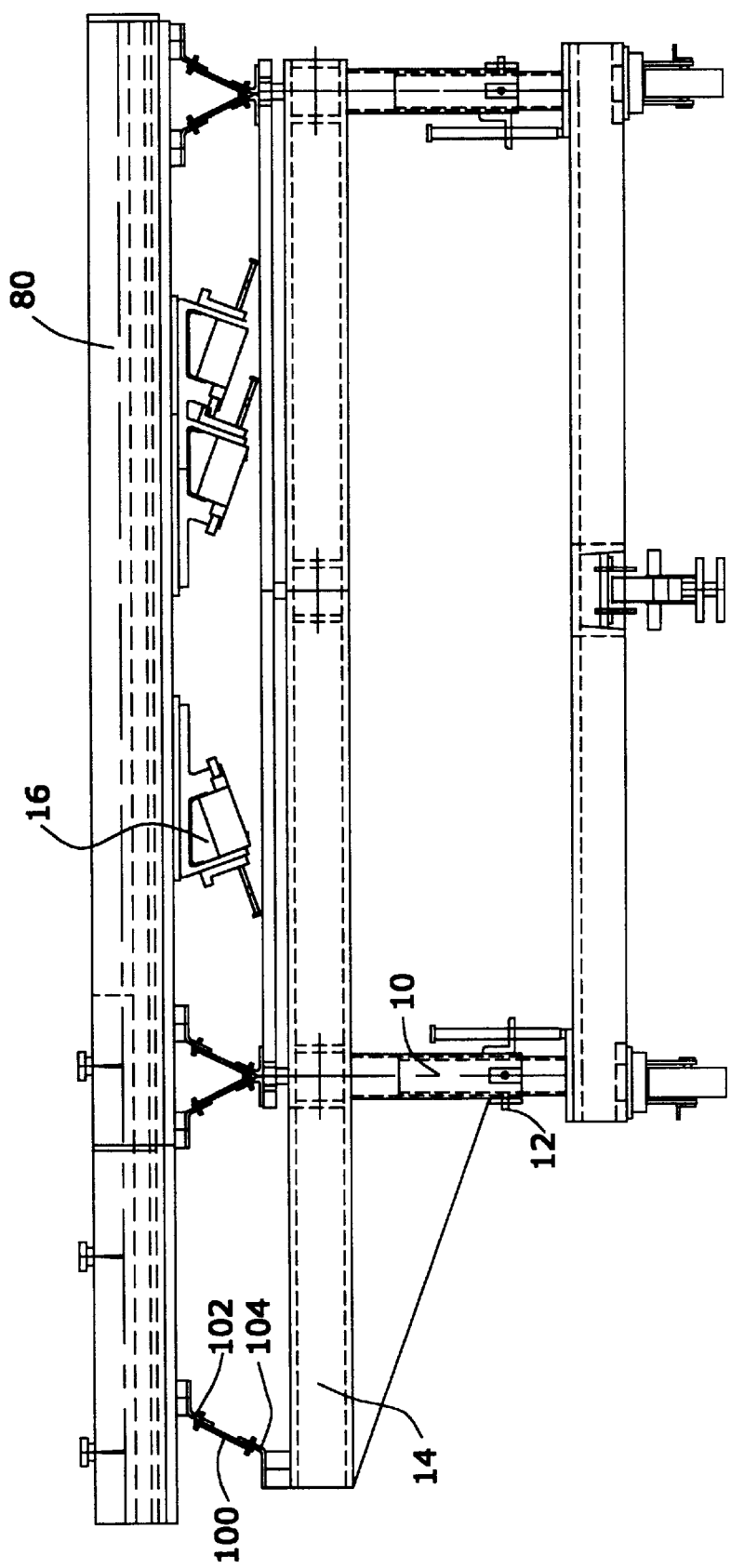
FIG. 8 is a side view of the conveyor system of FIG. 6.

Shown in FIGS. 3 and 4 is a peripheral wall 60 which is positioned along the boundaries of the feeder surfaces to prevent the articles from falling off of these surfaces. An adjustable retaining wall 61 aids in directing and controlling the flow of articles 26 being transported on the endless belt conveyor 52 and prevents the articles from falling off the far edge of the belt.

Referring to FIGS. 5–10, the present invention allows for the brush plates 80 (and 80a, referred to hereinafter as 80 for simplicity) to be easily made into any desirable length. The brush plates 80 are extruded in a standard length, for example, twenty-four feet lengths and, by making only a single cut across the width of the brush plates, are cut to the desired length. The need for only this single operation greatly reduces the manufacturing cost for the brush plates 80. The T-slots 82 for attaching the vibrators 16 and the bolt slots 84 for attaching the peripheral walls 60 are provided along the entire length of the brush plate 80 such that when the brush plate 80 is cut to any length, the vibrators 16 may be attached where desired. Also the bolt slots 84 will be accessible from the end 86 of the brush plate 80 so that the peripheral walls 60 may be attached. Preferably, the brush plates are manufactured in a variety of widths.

Figure 9:
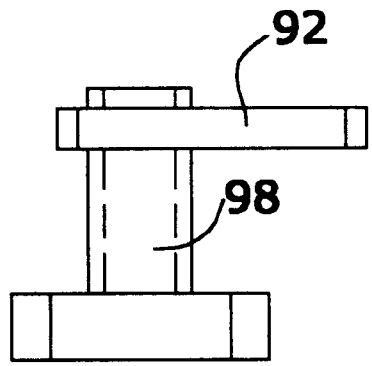
FIG. 9 is a side view of the T-nut and bolt of the present invention.
Figure 10:
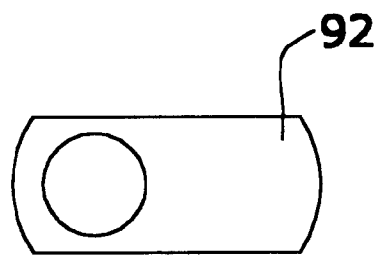
FIG. 10 is a top view of the T-nut of the present invention.

The T-slots 82 are designed to accept T-nuts 92 (FIGS. 9–10). Preferably, the T-nuts 92 are generally rectangular in shape and are adapted to slide into the T-slots 82. The vibrator is attached to an interface plate 94 (FIGS. 6–8) through conventional means. The interface plate 94 includes threaded holes 96 to accept a bolt 98. The T-nut 92 is threaded onto the bolt 98 and the T-nut 92 is slipped into the T-slot 82 so that the vibrator 16 is attached to the brush plate 80. The spring arms 100 are also connected at a first end 102 to the T-slots 82 through T-nuts 92. The opposite ends 104 of the spring arms 100 are connected to base 14 to support the brush plate 80. The bolt slots 84 may be tapped such that bolts 85 may be threaded into the bolt slots 84 to attach the peripheral walls 60.

As shown in the figures articles 26 are illustrated in particular by typical spotlight bulbs. The system of the present invention, however, is not limited to the processing of bulbs, but may accommodate any type of article of manufacture. While the present invention has been explained with reference to the structure of the preferred embodiment disclosed herein, it is not confined to the details set forth. Thus, this application is intended to cover any and all modifications or changes as may come within the scope of the following claims.

What is claimed is:

1. A vibratory conveyor, comprising:
   a base;
   support members attached to the base for supporting the base;
   a vibrator;
   a brush plate having a longitudinal axis, the brush plate mounted to the base for vibration by the vibrator, said brush plate including a brush surface and a plurality of rails integral with the brush surface, the rails extending substantially the entire length of the longitudinal axis of the brush plate, the rails including slots for connecting the vibrator to the brush plate.

2. The apparatus of claim 1 further including an interface plate having two sides, the vibrator attached to one side of the interface plate and the rails attached to the other side of the interface plate.

3. The apparatus of claim 1 further including a peripheral wall attached to one of the rails.

4. The apparatus of claim 1 wherein the brush plate is constructed of extruded aluminum.

5. The apparatus of claim 4 further including a spring arm connected between the brush plate and the base, one end of the spring arm being connected to one of the rails.

6. The apparatus of claim 2 further including a threaded nut inserted into one of said slots and a threaded bolt connected to the interface plate, the nut being threaded onto the bolt to attach the brush plate to the interface plate.

7. The apparatus of claim 3 wherein one of the slots contains internal threads and including a bolt extending through the peripheral wall into the threaded slot.

* * * * *